Sept. 15, 1959 P. J. H. JANSSEN ET AL 2,904,675

FREQUENCY DEMODULATOR

Filed Oct. 20, 1954

INVENTORS
PETER JOHANNES HUBERTUS JANSSEN
WOUTER SMEULERS
BY Fred M. Vogel
AGENT United States Patent Office 2,904,675

Patented Sept. 15, 1959

2,904,675

FREQUENCY DEMODULATOR

Peter Johannes Hubertus Janssen and Wouter Smeulers, Eindhoven, Netherlands, assignors, by mesne assignments, to North American Philips Company, Inc., New York, N.Y., a corporation of Delaware Application October 20, 1954, Serial No. 463,508

Claims priority, application Netherlands October 21, 1953

4 Claims. (Cl. 250—20)

This invention relates to a circuit arrangement for demodulating frequency-modulated input oscillations affected by unwanted amplitude modulation, the arrangement comprising an amplitude limiter followed by a push-pull frequency demodulator having two resonant circuits and two rectifiers to which the voltages derived from the resonant circuits are supplied both in co-phase (i.e., equal phase) and in push-pull, and an output filter common to these rectifiers, the demodulated signal being produced at this filter. An object of the invention is to provide an arrangement in which the demodulated signal produced is highly insensitive to the unwanted amplitude modulation of the input oscillations and is characterized by a limiter producing such a distortion of the said voltage fed in co-phase to the rectifiers that the corresponding unwanted amplitude modulation of the resultant voltages supplied to each of these rectifiers is substantially independent of the frequency of the input oscillations, at least within the working range of the demodulator.

The invention will be described with reference to the accompanying drawing, in which.

Figures 1, 2, 3, 4, 5, 6:
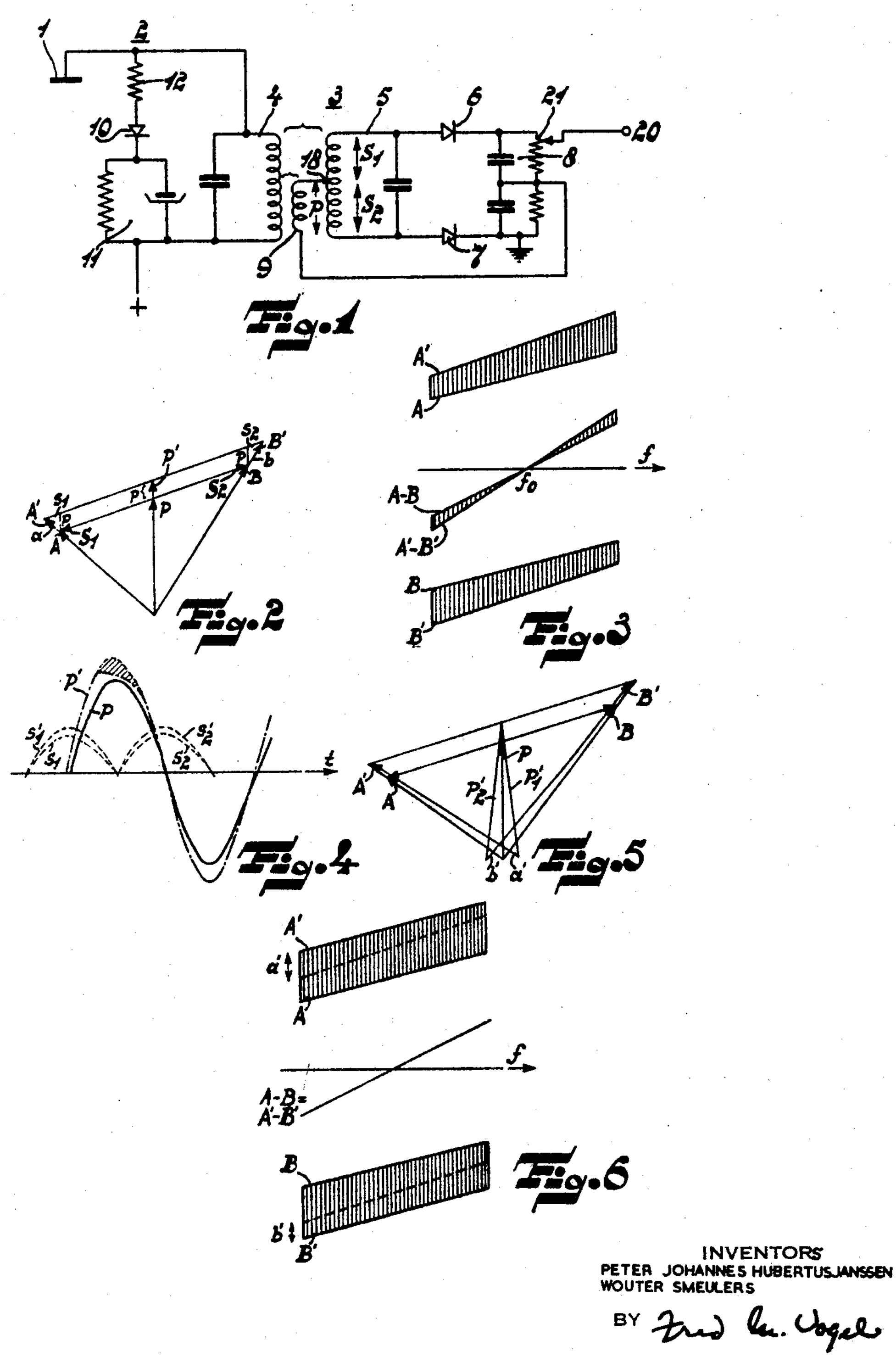
Fig. 1 shows a practical embodiment.
Figs. 2 and 5 show vector diagrams.
Figs. 3 and 6 show voltage-frequency diagrams.
Fig. 4 shows a voltage-time diagram to explain the arrangement shown in Fig. 1.

Referring to Fig. 1, the frequency modulated input oscillations produced across the output circuit of an intermediate-frequency amplifier 1 are supplied through a limiter stage 2 to a push-pull frequency demodulator 3, comprising a primary resonant circuit 4, a secondary resonant circuit 5, inductively coupled to the primary 4, two rectifiers 6 and 7 and an output filter 8, across which in known manner the demodulated signal is produced, since the voltage across the primary circuit 4 is supplied in co-phase through a tertiary winding 9, coupled fixedly to the primary winding, and the voltage across the secondary circuit 5 is supplied in push-pull, to the rectifiers 6 and 7 respectively.

For the central frequency $f_0$ of the input oscillations, at which the said co-phase and push-pull voltages have a phase-difference of 90° relative to one another, the demodulated signal is zero, i.e., insensitive to the unwanted amplitude modulation of the input oscillations; at a frequency change of the input oscillations, however, the demodulated signal produced varies in conventional arrangements proportionally to the amplitude modulation of the input oscillations; therefore this amplitude modulation has hitherto been suppressed as much as possible by means of the limiter.

Fig. 2 shows the associated vector diagram, in which P designates the voltage across the tertiary winding 9 and $S_1$ and $S_2$ designate the voltages across one half and the other half respectively of the secondary circuit 5. If, owing to undesired amplitude modulation of the input oscillations the voltage P increases by an amount $p$, so that also the voltages $S_1$ and $S_2$ increase by proportional amounts $s_1$ and $s_2$ respectively, the voltages A and B supplied to the rectifiers 6 and 7 respectively will increase also by proportional amounts, $a$ and $b$ respectively, to the values A′ and B′ respectively.

In Fig. 3 the lengths of the vectors A and B and A′ and B′ are shown on an exaggerated scale as a function of the input frequency $f$. The amplitude modulation of the voltages A and B may therefore be represented by the corresponding hatched ranges. The output filter 8 then receives a demodulated voltage equal to the difference between $A-B$ and $A'-B'$ respectively of these voltages, and thus the demodulator has a sensitivity to the unwanted amplitude modulation as indicated in Fig. 3 by the cross-hatching which crosses the zero-amplitude line.

The invention is based on the discovery of the fact that with a varied proportioning of the circuit elements the circuit arrangement shown in Fig. 1 can provide for example an amplitude suppression factor of 60 to 70 times for the unwanted amplitude modulation, i.e. a factor exceeding materially the suppression factor of for example 5 to 10 provided by the limiter 2 in itself. Use is made for example of a known type of limiter 2, comprising a rectifier 10 in series with a bias RC-filter 11 having a time constant exceeding the period of the lowest modulation frequency and, if necessary, in series with a resistor 12. Such a limiter produces a distortion of the voltage across the circuit 4, varying with the amplitude modulation of the input oscillations, and of the voltage across the winding 9, respectively.

In Fig. 4 this distorted voltage P and P′ across the winding 9 for various values of the input amplitude relative to the phase of the substantially undistorted voltages $S_1$ and $S_2$, $S'_1$ and $S'_2$ across the circuit 5 are shown as a function of time $t$. With a comparatively small input amplitude the voltage P is substantially sinusoidal (full line). However, as the input amplitude increases, the peak of the voltage P, at which the rectifier 10 becomes conductive (in the case shown the positive peak), is gradually more flattened (dot-and-dash line P′). However, since the surface areas of the signal over and under the time axis are constantly equal for an exact alternating voltage, the curve P′ has the form of a flattened sine curve which is shifted upwardly (as shown) relative to the time axis to such an extent that the surface area of the positive half-cycle which is lost by the flattening (indicated by hatching) is compensated, whereby the positive and negative excursions have equal areas. The upward shifting occurs because of the lack of D.-C. coupling between the circuits 4 and 9. It is evident that the front flank of the shifted flattened sine curve P′ relative to the phase of the voltage $S'_1$ and $S'_2$ respectively occurs earlier as shown; the rear flank however occurs later than that of the initial-unflattened sine curve P relative to the phase of the voltage $S_1$ and $S_2$ respectively.

In the vector diagram shown in Fig. 2, shown again in Fig. 5, it is evident that at the moment when the voltage $\vec{A'}=\vec{P'}+\vec{S'_1}$ passes its maximum and the rectifier 6, connected as a peak detector and having a corresponding pass direction, becomes transiently conductive, the vector P′ apparently leads slightly in time ($P'_1$) relative to the vector P, whereas at the instant when the voltage $\vec{B'}=\vec{P'}+\vec{S'_2}$ passes its maximum and the rectifier 7, connected as a peak detector, becomes conductive, the vector P′ lags slightly in time ($P'_2$) relative to the vector P. Owing to this effect, the amplitude modulation $A'-A$ and $B'-B$ of the vectors A and B respectively is further increased and as is evident from Fig. 5 the amplitude modulation $A'-A$ of the smaller vector A has increased more than that $(B'-B)$ of the larger vector B.

In Fig. 6, as in Fig. 3, the lengths of the vectors A and B, and A′ and B′ are plotted as a function of the frequency $f$; the hatched ranges correspond again to the amplitude modulations of the corresponding vectors. At least within the working range of the frequency demodulator it has been found to be possible to adjust the amplitude modulation $a'$ and $b'$, produced in addition to that shown in Fig. 3 by the distortion of the voltage P' (Fig. 4), this amplitude modulation varying substantially only on the one hand with this distortion, i.e. with the suppression factor $\alpha$ of the limiter 2 and on the other hand with the angle between the vectors A and B and the vector P, i.e. with the ratio $S/P$, in a manner such that the total amplitude modulation $A'-A$ and $B'-B$ of the vectors A and B respectively becomes substantially independent of the frequency $f$. If $A'-A=B'-B$, the demodulated frequency-modulation signal $A-B=A'-B'$ will be independent of the unwanted amplitude modulation, as shown in Fig. 6.

In this case it is of importance to choose the capacitors of the filter 8 to be small, since otherwise phase displacement for the maximum modulation frequencies between the modulations $A'-A$ and $B'-B$ will occur, so that incomplete compensation is obtained.

In practice it is found that the adjustment with which $A'-A$ and $B'-B$ are independent of the frequency $f$ is obtained if the amplitude suppression factor $\alpha$ of the limiter 2 approximately corresponds to the formula $\alpha=6P/S$, wherein P designates the voltage across the winding 9 or in general the voltage supplied in co-phase to the rectifiers 6 and 7 and S designates the mean value of the voltages $S_1$ and $S_2$, produced across each of the halves of the circuit 5 or in general the voltages supplied in push-pull to the rectifiers 6 and 7. At a given ratio $P/S$, $\alpha$ may be adjusted in practice in accordance with this formula, for example by controlling the resistor of the bias filter 11 or the resistor 12 or the damping of the circuit 4. This control is, in general, not critical, so that considerable deviations from the aforesaid formula are permissible before an unadmissibly great sensitivity of the demodulated signal to the unwanted amplitude modulation is found.

Since the front flank of the voltage P' of Fig. 4 leads more, in general, relative to the voltage P than its rear flank lags in time relative to P, the voltage A corresponding to this front flank will have a greater amplitude modulation depth.

$$\frac{A'-A}{A}$$

than the voltage B corresponding to the rear flank of P'. If the adjustment is such that the amplitude modulations $A'-A$ and $B'-B$ are independent of the frequency $f$, the voltage A must be chosen to be slightly lower, for example 20% lower than the voltage B, since $A'-A$ should be equal to $B'-B$. In practice this may be obtained by providing the tap 18 of the circuit 5 accordingly asymmetrically or by providing unequal halves of the inductance of the circuit 5 by means of a slidable ferromagnetic core (not shown) or by connecting the output terminal 20 to a tap 21 of the output filter 8 or by combining the aforesaid measures in a manner such that the rectifier 6 corresponding to the front flank contributes to a smaller extent to the demodulated signal than the other rectifier 7.

In a practical embodiment the circuit elements shown in Fig. 1 had the following values: Rectifiers 6, 7 and 10=crystal rectifiers (pass resistance about 100 ohms); bias filter 11=33,000 ohms and 5 microfarads; resistor 12=short-circuited, $\alpha$ being 6; $P/S=1$; output filter 8= two 68,000 ohm resistors and two 56 microfarad condensers; tap 21 at 18,000 ohms from the top. Amplitude suppression factor obtained=more than 50 times and very little dependent upon the normal variations of the pass resistance of the rectifiers.

While a preferred embodiment of the invention has been shown and described, various other embodiments and modifications thereof will be apparent to those skilled in the art, and will fall within the scope of invention as defined in the following claims.

What is claimed is:

1. A frequency demodulator comprising a source of frequency modulated input oscillations subject to having unwanted amplitude modulation, an amplitude limiter stage connected to receive said oscillations and comprising means for flattening the peak portions of one polarity of said oscillations, and a push-pull frequency demodulator having two rectifiers, a first resonant circuit coupled to receive the oscillations from said limiter stage and connected to said rectifiers to apply said last-named oscillations in push-pull, a second resonant circuit coupled to receive the oscillations from said limiter stage and connected to apply said last-named oscillations to said rectifiers in co-phase, said rectifiers being polarized to be conductive with respect to said one polarity of the co-phase oscillations, an output filter connected to both of said rectifiers, said co-phase oscillations being inherently substantially 90° out-of-phase with said push-pull oscillations, whereby the front flanks of said co-phase oscillations occur during one phase of said push-pull oscillations and the rear flanks of said co-phase oscillations occur during the other phase of said push-pull oscillations, including means connected to reduce the amount of unwanted amplitude modulation components in said output filter during said one phase.

2. The demodulator as claimed in claim 1, in which said limiter comprises a resistor and a capacitor connected in a parallel combination and a rectifier connected in series combination with said parallel combination, said series combination being connected in shunt with respect to said input oscillations, said parallel combination having a time constant exceeding the period of the lowest modulation frequency of said input oscillations thereby biasing said last-named rectifier to be relatively more conductive when the amplitude of said input oscillations increases.

3. The demodulator as claimed in claim 1, in which the amplitude suppression factor $\alpha$ of said limiter is determined substantially by the relationship $\alpha=6P/S$, where P is the mean amplitude of said co-phase oscillations and S is the mean value of said push-pull oscillations.

4. A frequency demodulator for demodulating frequency modulated input oscillations subject to having unwanted amplitude modulation, comprising an amplitude limiter and a push-pull frequency demodulator having first and second resonant circuits, two rectifiers and an output filter, said amplitude limiter being connected to receive said input oscillations and comprising means for flattening the peak portions of one polarity of said oscillations, means coupling said limiter to said frequency demodulator to generate a first voltage across said first resonant circuit having a substantially flattened wave form and to generate a second voltage across said second resonant circuit having a substantially sinusoidal wave form, means for supplying said first voltage in co-phase and said second voltage in push-pull to said rectifiers to produce a demodulated oscillation across said output filter which is substantially independent of said unwanted amplitude modulation, said frequency demodulator including means connected to provide a small unbalance at which the one of said rectifiers, which becomes conductive at an instant before the frequency of said flattening, contributes a smaller amount to the demodulated signal across said output filter than the other of the said rectifiers.

References Cited in the file of this patent

UNITED STATES PATENTS

| | | |
|---|---|---|
| 2,121,103 | Seeley | June 21, 1938 |
| 2,251,382 | Sziklai | Aug. 5, 1941 |
| 2,285,957 | Wheeler | June 9, 1942 |
| 2,341,937 | Maynard | Feb. 15, 1944 |
| 2,477,391 | Reid | July 26, 1949 |
| 2,478,023 | Summerhayes | Aug. 2, 1949 |
| 2,524,556 | Worcester | Oct. 3, 1950 |
| 2,539,637 | Sands | Jan. 30, 1951 |
| 2,561,059 | Corrington | July 17, 1951 |